(12) United States Patent
Miyata

(10) Patent No.: US 8,223,391 B2
(45) Date of Patent: Jul. 17, 2012

(54) SYSTEM AND METHOD FOR PRODUCING PRINT INSTRUCTION INFORMATION TO BE TRANSMITTED TO A PRINTING DEVICE

(75) Inventor: Shigeo Miyata, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1032 days.

(21) Appl. No.: 11/769,764

(22) Filed: Jun. 28, 2007

(65) Prior Publication Data

US 2008/0180700 A1  Jul. 31, 2008

(30) Foreign Application Priority Data

Jan. 30, 2007  (JP) ................. 2007-020021

(51) Int. Cl.
H04N 1/00 (2006.01)
(52) U.S. Cl. .......... 358/1.6; 358/1.1; 358/1.2; 358/1.12; 358/1.14; 358/1.15; 358/1.18
(58) Field of Classification Search ............... 358/1.6, 358/1.18, 1.14, 1.15, 1.12, 1.1
See application file for complete search history.

(56) References Cited

U.S. PATENT DOCUMENTS

| | | | |
|---|---|---|---|
| 5,890,173 A | | 3/1999 | Yoda |
| 6,507,410 B1 * | | 1/2003 | Robertson et al. ........... 358/1.18 |
| 6,650,434 B1 * | | 11/2003 | Bruce ............... 358/1.18 |
| 7,017,108 B1 | | 3/2006 | Wan |
| 7,847,966 B2 * | | 12/2010 | Watanabe et al. ............ 358/1.15 |
| 2001/0046059 A1 * | | 11/2001 | Motamed et al. ............ 358/1.12 |
| 2002/0180822 A1 * | | 12/2002 | Aritomi ................. 347/19 |
| 2003/0026626 A1 * | | 2/2003 | Sunada et al. .............. 399/82 |
| 2003/0164980 A1 * | | 9/2003 | Masaki ............... 358/1.18 |
| 2004/0179231 A1 * | | 9/2004 | Savino et al. ............. 358/1.15 |
| 2005/0185220 A1 * | | 8/2005 | Martinez ............... 358/1.18 |
| 2007/0121174 A1 * | | 5/2007 | Higashiura ............ 358/464 |
| 2007/0127067 A1 * | | 6/2007 | Watanabe et al. ............ 358/1.15 |

FOREIGN PATENT DOCUMENTS

| | | |
|---|---|---|
| JP | 9146719 | 6/1997 |
| JP | 2000090085 | 3/2000 |
| JP | 2002366564 | 12/2002 |

* cited by examiner

Primary Examiner — Jacky X Zheng
(74) Attorney, Agent, or Firm — Gesmer Updegrove LLP

(57) ABSTRACT

An image processor according to the present invention includes a reference information acquisition unit that acquires reference information for specifying a reference source and a reference target associated with the reference source from an electronic document having the reference information indicated therein, and a print instruction information production unit that produces print instruction information including an instruction for causing a printing device to print a reference source index for representing a reference source in a margin region located at a peripheral edge of a reference source page specified based on the reference information, and an instruction for causing the printing device to print a reference target index for representing a reference target in a region overlapping the region where the reference source index is printed in a margin region located at a peripheral edge of a reference target page specified based on the reference information.

16 Claims, 12 Drawing Sheets

| LINK RELATION NUMBER | | 1 | 2 | 3 | 4 | 5 | 6 | 7 | 8 | 9 | 10 |
|---|---|---|---|---|---|---|---|---|---|---|---|
| LINK SOURCE INFORMATION | PAGE | 1 | 1 | 5 | 6 | 5 | ... | ... | ... | ... | ... |
| | LINE | 11 | 15 | 20 | 5 | 8 | ... | ... | ... | ... | ... |
| LINK TARGET INFORMATION | PAGE | 2 | 4 | 2 | 3 | 8 | ... | ... | ... | ... | ... |
| | LINE | 1 | 8 | 1 | 26 | 9 | ... | ... | ... | ... | ... |
| PRINT REGION NUMBER | | 1 | 2 | 1 | 3 | 4 | ... | ... | ... | ... | ... |

SYSTEM AND METHOD FOR PRODUCING PRINT INSTRUCTION INFORMATION TO BE TRANSMITTED TO A PRINTING DEVICE

CROSS-REFERENCE TO RELATED APPLICATIONS

This application is based on, and claims priority under 35 USC 119 from, Japanese Patent Application No. 2007-020021 filed on Jan. 30, 2007.

BACKGROUND

1. Technical Field

The present invention relates to image processors, recording media and methods, and computer data signals.

2. Related Art

One of the functions provided with electronic documents formed based on HTML (HyperText Markup Language) and those formed using word processing software is a "link function".

In an electronic document using the link function, link target information is indicated corresponding to, for example, text or a graphic of a link source. The link target information is, for example, a URL of a web page or a page number of the link target. When, for example, a user clicks the text or the graphic of the link source on the page displayed on the screen, a Web page or a page in the document corresponding to the link target information contained therein is displayed on the screen. However, the document reflecting the link information is not produced simply by printing the electronic document containing the link information.

SUMMARY

The present invention provides an image processor including a reference information acquisition unit that acquires reference information for specifying a reference source and a reference target associated with the reference source from an electronic document having the reference information indicated therein, and a print instruction information production unit that produces print instruction information including an instruction for causing a printing device to print a reference source index for representing a reference source in a margin region located at a peripheral edge of a reference source page specified based on the reference information, and an instruction for causing the printing device to print a reference target index for representing a reference target in a region overlapping the region where the reference source index is printed in a margin region located at a peripheral edge of a reference target page specified based on the reference information.

BRIEF DESCRIPTION OF THE DRAWINGS

Exemplary embodiments of the present invention will be described in detail based on the following figures, wherein.

DETAILED DESCRIPTION

An exemplary embodiment in which the best mode for carrying out the present invention is specifically presented will now be described with reference to the drawings.

Figure 1:
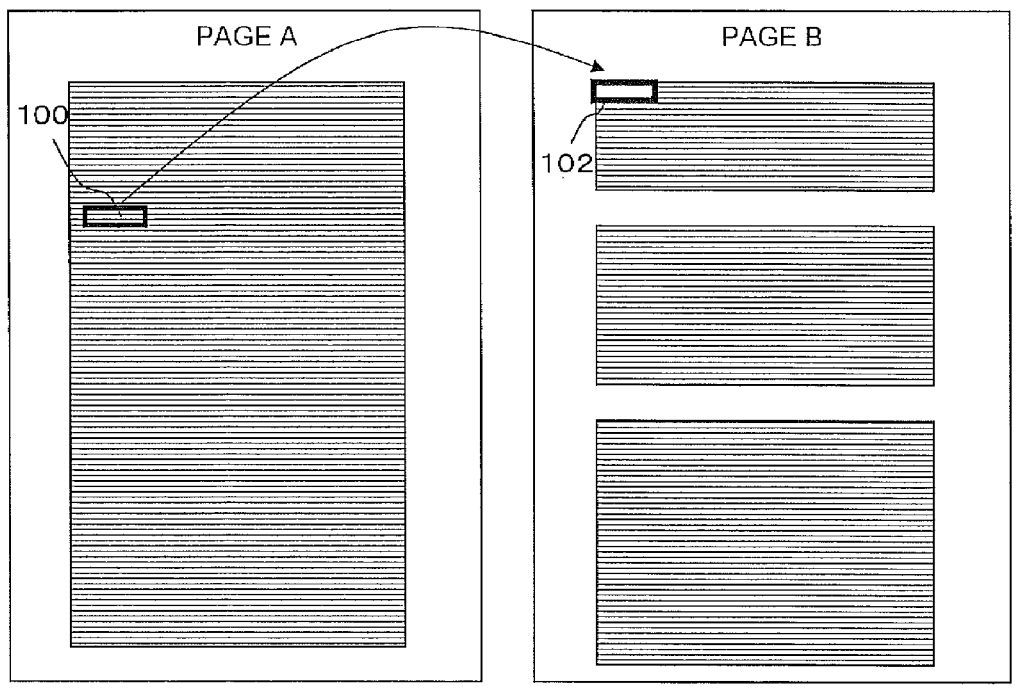
FIG. 1 is a view for describing an electronic document having link information indicated therein.

FIG. 1 shows an image of an electronic document including indication of link information for specifying a link source page providing a reference and a link target page, to which the reference is made, associated with the reference source. In FIG. 1, the electronic document contains, in association with a link source 100, which is a page element forming the contents of page A, link target information indicating the position of a link target 102 (such as information indicating a pair of a page number and a line number of the link target 102), which is a page element of page B. For example, when a user clicks the link source 100 of page A displayed on the screen, page B corresponding to the link target 102 is displayed thereon based on the link target information associated with the link source 100. Note that a page element refers to a text, a symbol, a graphic, an image, or the like forming the contents of the page. By thus using the link information in the electronic document, users can move the page they are viewing (hereinafter referred to as a viewed page) from the link source page to the link target page. However, the link information indicated in the electronic document is generally not reflected on the printed version of the document. In other words, association between, for example, a link source page and a link target page, is lost when printed.

In view of this fact, according to the exemplary embodiment of this invention, upon printing an electronic document in which link information is indicated on a sheet, a link source mark 120 and a link target mark 122 (herein after simply referred to as "link marks" when the link source mark 120 and the link target mark 122 are referred to in general terms) are printed in overlapping regions at the margins of the link source page A and the link target page B, respectively. By thus printing each link mark, users can associate the link source page and the link target page.

Figure 2A:
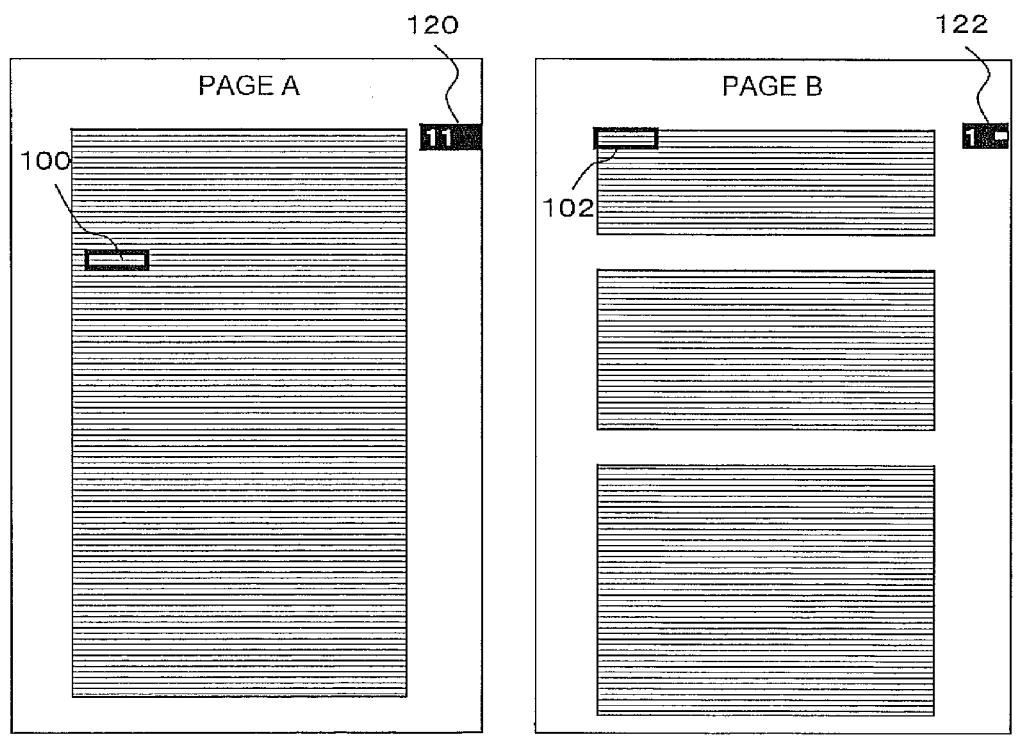
FIG. 2A is a view for describing a link mark printed on a sheet based on the link information indicated in the electronic document.
Figure 2B:
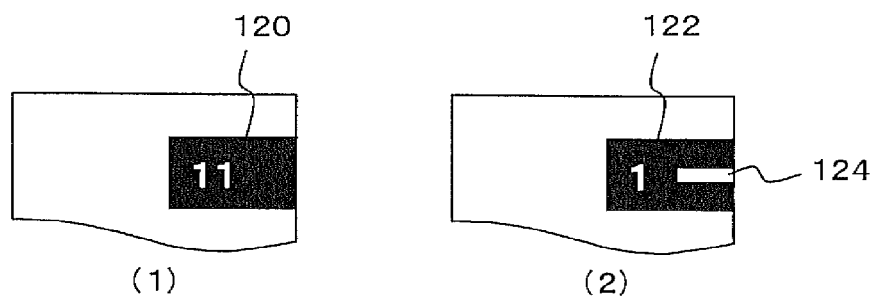
FIG. 2B is a view for describing the link mark printed on the sheet based on the link information indicated in the electronic document.

FIG. 2B shows enlarged images (1) and (2) of the printed portions of the link source mark 120 and the link target mark 122, respectively. Referring to FIG. 2B, a line number is printed in each link mark as position information for specifying the position thereof in the link source or link target page. A line number is only an example of the position information. If the link source or link target is an illustration, a figure number corresponding to the illustration may be used. Alternatively, if a sign, such as "Note 1", is printed in the link source or link target, such a sign may be used, and part or all of a text string forming the link source or target may also be used. In order to distinguish between the link source mark 120 and the link target mark 122, a line 124 is marked in the link target mark 122 as a marker indicating a link target. Although the line. 124 is used to visually differentiate the link source and the link target, signs other than a line may be used to distinguish between the link source mark 120 and the link target mark 122, as long as the marks are visually different.

Figure 2C:
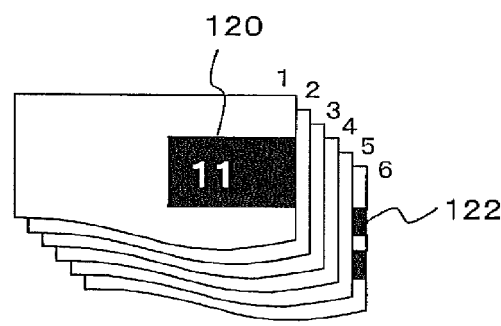
FIG. 2C is a view for describing the link mark printed on the sheet based on the link information indicated in the electronic document.

FIG. 2C illustrates an image of the printed document showing in an enlarged manner the edges of the pages including the region where a link mark is printed when the link source page A is page 1 and the link target page B is page 6. When a user wishes to change the viewing area from the link source on line 11 of page A of the printed document shown in FIG. 2C to the link target on page B thereof, for example, the user refers to the fore-edges of the pages, and identifies the page where the link target mark is printed in the region overlapping the link source mark on the fore-edge, thereby specifying the link target page B. Further, by checking the position information, such as a line number, in the link target mark 122 on page B, the user can specify the position of the link target on the page. As a result, the user can change the viewing area from the link source to the link target.

On the other hand, when the user wishes to change the viewing area from the link target on line 1, page B to the link source on page A, the user specifies the page having the link source mark printed at the region of the edge overlapping the link target mark to locate the link source page A. Further, the position of the link source on the page can be found by checking the position information, such as the line number, in the link source mark 120 on page A.

A printing system for producing a printed document having the above-described link mark printed thereon based on an electronic document indicating link information will be described with reference to the drawings.

Figure 3A:
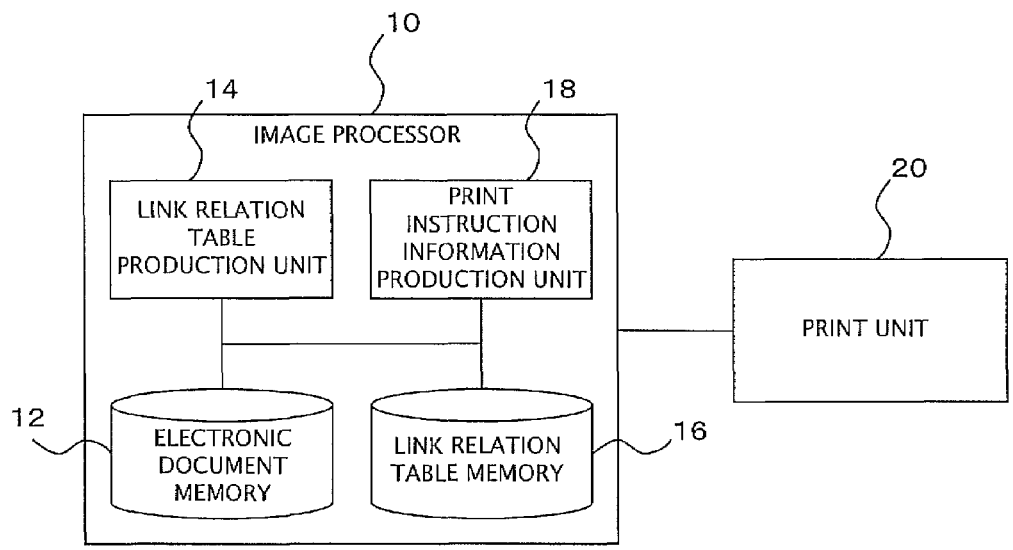
FIG. 3A is a diagram showing functional blocks of a printing system according to an exemplary embodiment of the present invention.

FIG. 3A shows functional blocks of a printing system according to the exemplary embodiment of the present invention. According to the exemplary embodiment, an image processing unit 10 produces print instruction information including an instruction to print a link mark based on an electronic document, and outputs the information to a print unit 20. The print instruction information is control information for causing the print unit 20 to print a desired print image, such as information described in page description language (PDL). The print unit 20 prints each page element and each link mark on each sheet based on the print instruction information supplied from the image processing unit 10, and produces a printed document having a link mark printed thereon. When the print instruction information is described in PDL, the print unit 20 produces bit map data of the print image based on the print instruction information, and prints the bit map data on the sheet. The term "sheet" refers not only to plain paper, but also to overall media to be printed, such as OHP film, heavy paper, postcards, and the like.

The printing system according to the present exemplary embodiment may be configured by a device having at least a printer driver, such as a personal computer, functioning as the image processing unit 10, and a device at least having a printing function, such as a printer, a copier, a facsimile device, and the like, functioning as the print unit 20, the devices being connected to each other through a network. Alternatively, one device may function as the image processing unit 10 and the printing unit 20.

Referring to FIG. 3A, the image processing unit 10 includes an electronic document memory 12, a link relation table production unit 14, a link relation table memory 16, and a print instruction information production unit 18. The electronic document memory 12 stores an electronic document supplied as the document to be printed. The link relation table production unit 14 functions through execution of a program stored in a memory device such as a RAM (Random Access Memory), a ROM (Read Only Memory), or a hard disk device (hereinafter simply referred to as a memory device) by a Central Processing Unit (CPU), and produces a link relation table through the below-described procedure based on link information indicated in the electronic document. The link relation table and the procedure for producing the table will be described later. The link relation table memory 16 stores the link relation table produced by the link relation table production unit 14. The print instruction information production unit 18 functions through execution of the program stored in a memory device, for example, by the CPU, and produces the print instruction information based on the electronic document stored in the electronic document memory 12 and the link relation table stored in the link relation table memory 16.

Figures 4, 5:
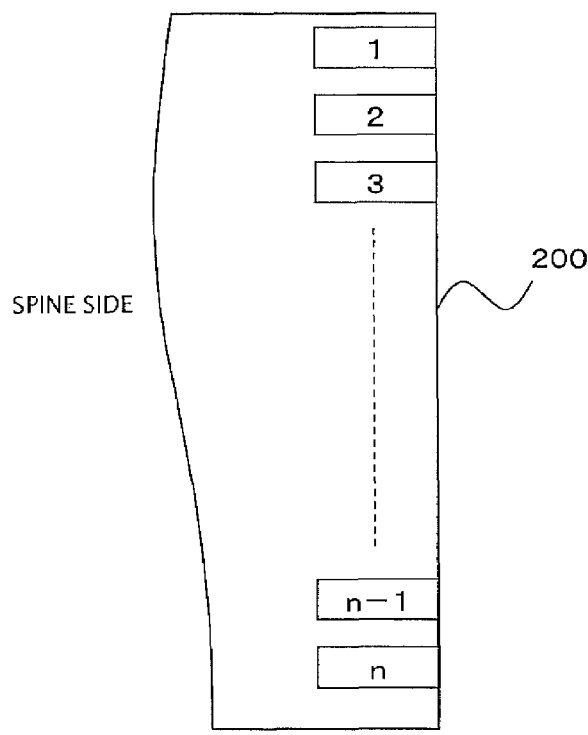
FIG. 4 illustrates an example of a link relation table.
FIG. 5 is a view for describing a print region of the link mark allocated on a side edge of the sheet.

The link relation table is a table formed, for example, as shown in FIG. 4. The link relation table registers link source information and link target information included in an electronic document in association with each other as a link relation. The link source information indicates a page number and position information of the link source. The link target information indicates a page number and position information of the link target. Each link relation is associated with a print region number corresponding to a region where a link mark is printed for that link relation. Print regions for the respective print region numbers may be spaced apart by a predetermined distance along an edge (i.e. fore-edge) opposite to the edge of the sheet on the spine side, as illustrated in FIG. 5.

Figure 6:
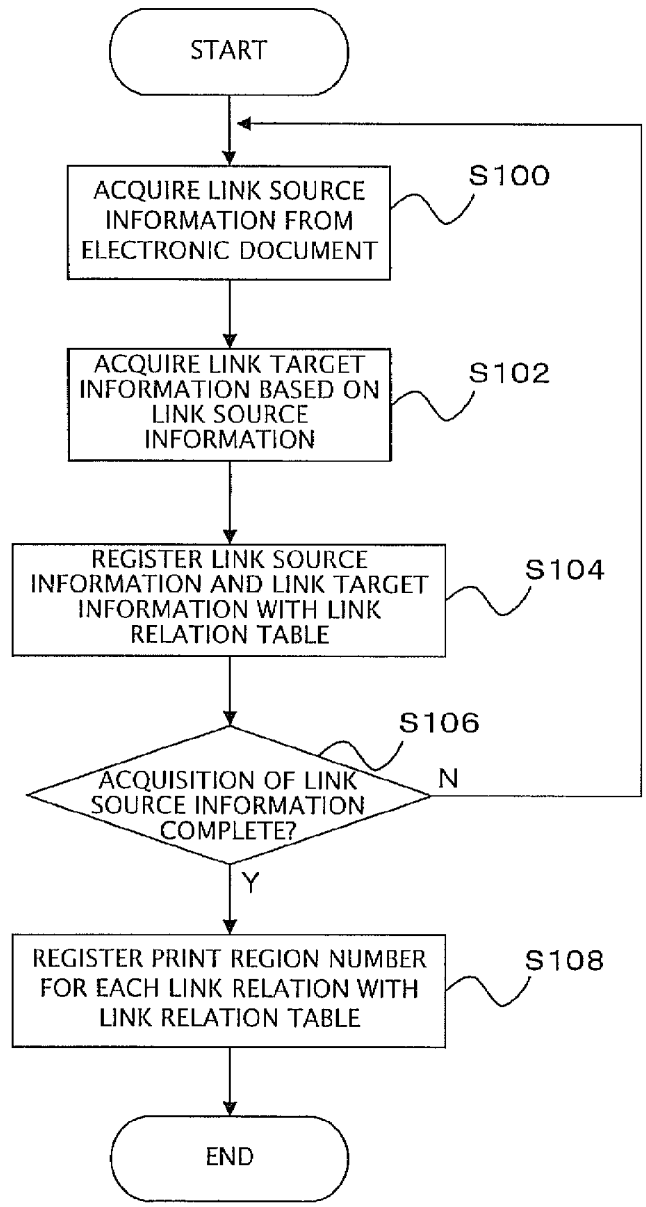
FIG. 6 is flow chart showing a procedure of producing the link relation table based on the link information indicated by electronic information performed by a link relation table production unit.

An example of a procedure performed by the link relation table production unit 14 to produce a link relation table based on link information indicated in the electronic document will be described with reference to the flowchart of FIG. 6.

When an electronic document to be printed is supplied, the link relation table production unit 14 analyzes the electronic document to acquire link source information (S100). When the electronic document is, for example, an HTML document, a region expressed in an anchor element (<a>) is retrieved from the document, thereby specifying link source information based on the region. The link relation table production unit 14 further acquires link target information based on the acquired link source information (S102). The link target information is specified based on, for example, "href attribute", "name attribute", "id attribute" in the anchor element. Particularly, since a cross-reference within the document printed as a single document is made possible according to the present exemplary embodiment, the link source having a link target set in the same document, and the link target, are to be specified. Notably, for the link source having the link target set in the same document as described above, "href attribute" is described without a file name in the <a> tag. More specifically, the portion used as the link source is provided with a tag <a href="# . . . >. By thus extracting the description designating a fragment with a fragment identifier without a file name as the href attribute, the link target located in the same document and corresponding to the link source can be extracted to specify the position of the link target in the document.

Figure 3B:
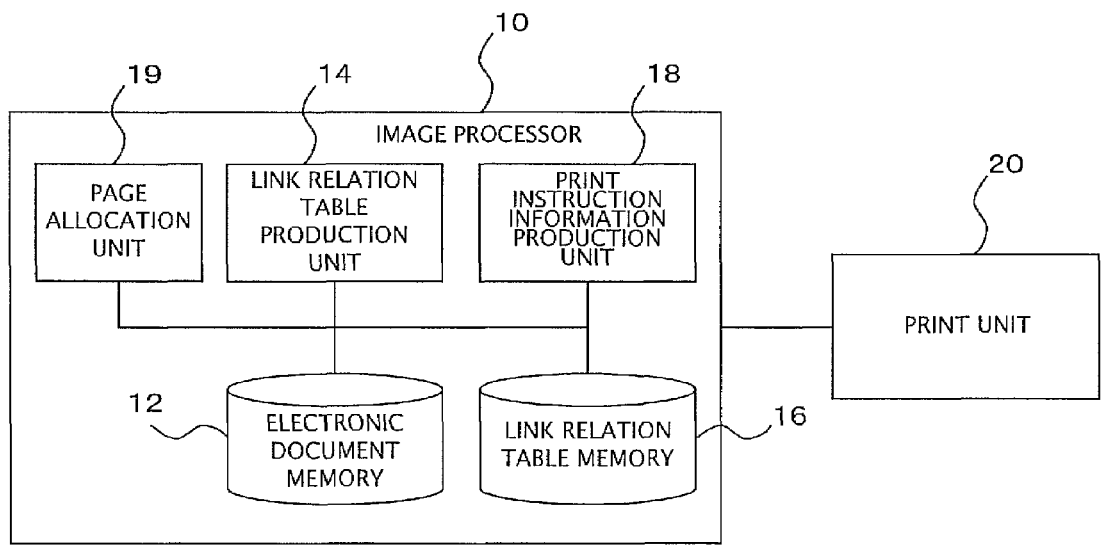
FIG. 3B is a diagram showing functional blocks according to a modification of the printing system according to the exemplary embodiment of the present invention.

In the meantime, the link relation table according to the exemplary embodiment of the present invention stores page numbers and position information of the link source and target as a link relation. When a document is an HTML document, the document itself is not described on the page by page basis until an instruction to print it on the sheet is given. Therefore, upon producing the link relation table, a page allocation unit 19, for example, is provided in the image processing unit 10 as shown in FIG. 3B. The page allocation unit 19 may extract a page break appearing when the HTML document is printed so as to determine the line number and page number of each link source or target when printed. Based on the determination, the page number and line number of the position where an anchor element (information having the <a> tagset) functioning as a link source is located, and those of the position of the information which corresponds to the link target identified by the id attribute and name attribute corresponding to the fragment identifier indicated by the href attribute described in the anchor element may be acquired. By producing the link relation table based on the thus obtained link relation, even for a document which is not based on the concept of pages, such as HTML documents, the position information of the printed document may be specified and link relation may be registered.

For document files in such a format that information on the correspondence between the link source and target within a document can be held, such as the PDF (portable document format) format or Word Format of Microsoft Corporation, such information may be extracted from the document file. For example, when the document itself is based on the concept of pages and the link source and target can be specified by information such as the page or the line, or when the document holds information that can be converted to the information of pages and lines to thereby allow acquisition of the information of pages and lines based on the held information, the link information of the link source and target may be extracted, so that the link relation table may be produced by the link relation table production unit.

The link relation table production unit 14 then registers the acquired link source information and link target information with the link relation table in association with each other (S104) The link relation table production unit 14 repeats the process from the step S100 until all link source information is acquired from the electronic document (while the determination result at a step S106 is "NO").

On the other hand, if all link source information has been acquired from the electronic document (if the determination result at the step S106 is "YES"), the link relation table production unit 14 registers the print region number of each link relation with the link relation table (S108).

The link relation table production unit 14 may basically allocate the print region number in the order of acquisition of link source information. It should be noted, however, that plural link sources may be associated with a single link target, and that in such a case only one link target mark may be printed on the link target page. For this purpose, each link source mark and the link target mark associated therewith may be printed at the print region overlapping each other when the sheets are bound.

Figure 7:
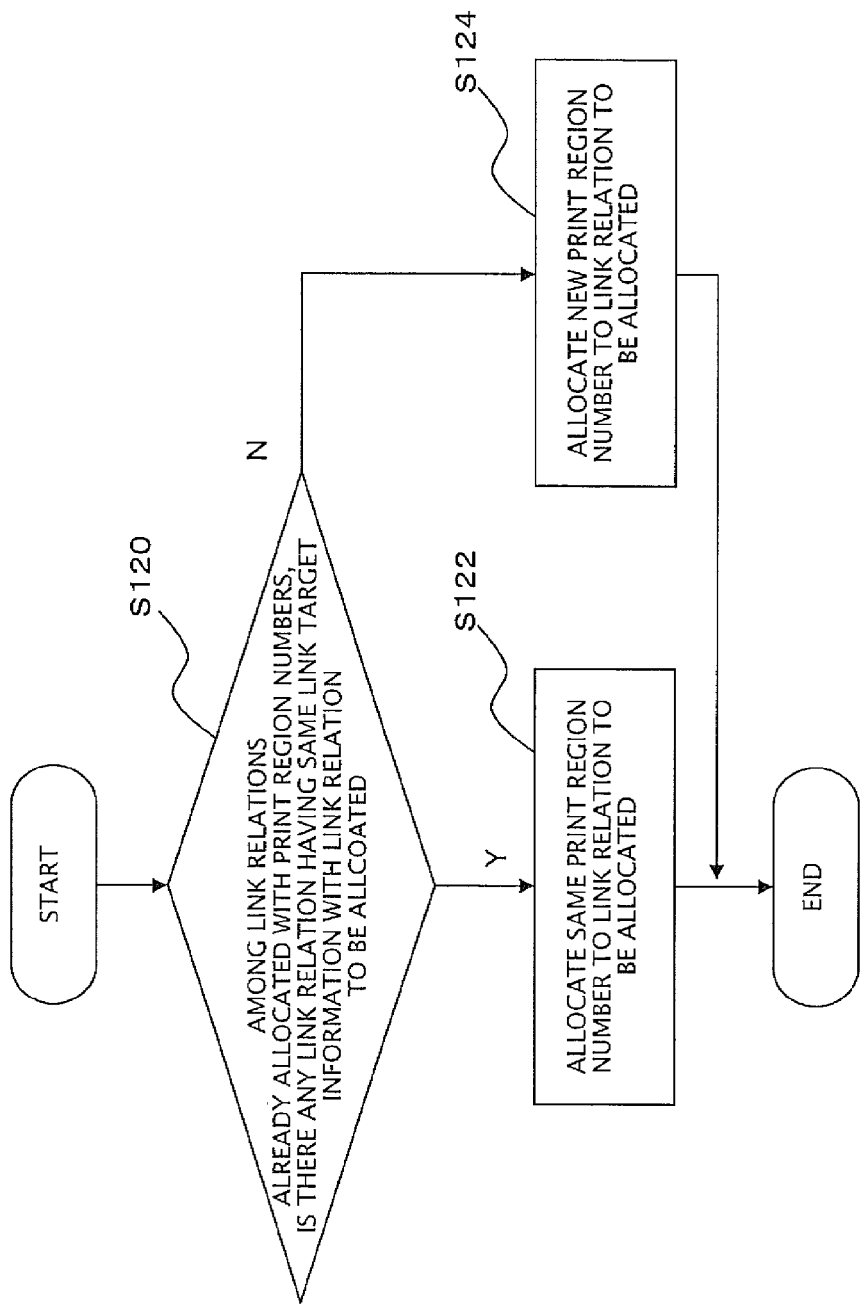
FIG. 7 is a flow chart showing a procedure of assigning a print region number to each link relation based on the link information indicated by electronic information performed by the link relation table production unit.

Considering such a case, the link relation table production unit 14 may allocate the print region number to each link relation based on, for example, the flowchart shown in FIG. 7.

More specifically, when the print region number is to be allocated to a link relation, the link relation table production unit 14 first refers to the link relation table, and determines whether or not the link relation indicating the same link target information as the link target of the link relation to be allocated can be found among the link relations to which the print region numbers are already allocated (S120). If the determination indicates that the link relation having the same link target information is found (the result of determination at the step S120 is "YES"), the same print region number as that of the link relation having the same link target information is allocated to the link relation to be allocated (S122). On the other hand, if a link relation having the same link target information cannot be found (the result of determination at the step S120 is "NO"), the link relation to be allocated receives a new print region number (S124).

Such a method of allocating print region numbers can prevent the link target marks from being printed on plural regions for a single link target even if that single link target is associated with plural link sources. In the link relation table shown in FIG. 4, the link relation allocated with the link relation number "1" and the link relation allocated with the link relation number "3" have the same link target information, and these link relations are allocated with the same print region number.

Based on the thus produced link relation table and the electronic document, the print instruction information production unit 18 produces print instruction information including an instruction to print a link mark in a print region corresponding to each link relation, and outputs the information to the print unit 20. The unit 20 produces the printed document as shown in FIG. 2A based on the print instruction information supplied thereto.

If an electronic document contains plenty of link information, only the predetermined print regions as shown in FIG. 5 may not be enough to print all the link marks. Further, some link information items are more important to users than others. Thus, it may be preferable to narrow down the link marks to be printed based on the user's wish or the like if the electronic document contains plural link information items.

In view of this fact, some examples will be given for the process of narrowing down the link marks.

<Designating Page Range>

The link relation table production unit 14 prompts a user to designate a range of the electronic document for acquiring link information on, for example, a page by page basis, and acquires the link information only from the designated range to produce a link relation table.

Figure 8:
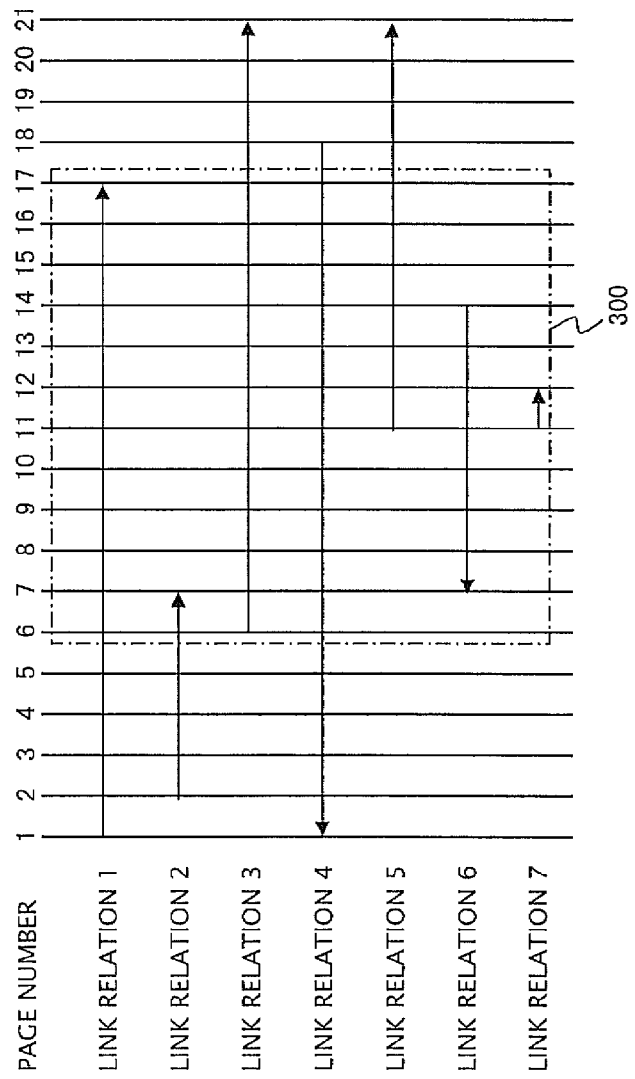
FIG. 8 is a view showing an example of correspondence between each page and each link relation.

More specific description will be given in relation to an example having pages and link relations shown in FIG. 8. In FIG. 8, a tail of each arrow indicates a link source page, while a head thereof indicates a link target page. The document having a total of 21 pages shown in FIG. 8 will be hereinafter referred to as a document P.

It is assumed here that a user designates, for example, pages 6-17 as a link range 300 out of all the pages of the document P. In such a case, some link relations in the range 300 include both the link source and the link target while others include only one of the link source and the link target. Therefore, it is preferable to prompt the user to choose the link relation to be registered with the link relation table from the following four conditions.

(1-1) Select only the link relation having both the link source and target included in the link range. For the document P, link relations 6 and 7 are selected.

(1-2) Select the link relation having at least the link source included in the link range. For the document P, link relations 3, 5, 6, and 7 are selected.

(1-3) Select the link relation having at least the link target included in the link range. For the document P, link relations 1, 2, 6, and 7 are selected.

(1-4) Select the link relation having at least the link source or the link target in the link range. For the document P, link relations 1, 2, 3, 5, 6, and 7 are selected.

From the above four conditions, the user may select the condition so that a desired link relation is included.

It is assumed here as an example that an electronic document including link information indicated therein, such as a PDF file, is an instruction manual for a device, such as a mobile phone. It is further assumed that the range where a particular function is described extends from page $\alpha$ to page $\beta$, that the operation to be performed in advance in order to use the function is described on the page outside the range, and that this page is associated as the link source and page $\alpha$ is associated as the link target. In order for the user to easily specify the page on which the operation to be performed before using that function is described, preferably the range from page $\alpha$ to page $\beta$ is designated as the link range, so that the link source page located outside the link range can be easily known. Therefore, in such a case, it is preferable for the user to select the condition (1-3).

While continuous pages are designated as the link range in the above-described example, the link range may be separately designated on a page by page basis. More specifically, discontinuous pages, such as pages 1-24, 27, and 32, may be designated as the link range. Further, the link range may be designated in more detail by designating the paragraph number and the line number in addition to the page, or an area in the page.

<Designating the Order of Acquiring Link Information>

The link relation table production unit 14 may acquire link information based on a preset acquisition order, and allocate the print region number to the acquired information in order of acquisition starting with the first acquired item.

Specific examples of setting the acquisition order include the following four:

(2-1) Acquire link information in ascending order from the first page.

This is preferable when, for example, a link mark is printed for the link target associated with the link source located on the table of contents page.

(2-2) Acquire link information in descending order from the last page.

This is preferable when, for example, a link mark is printed for the link target associated with the link source located on the index page.

(2-3) Acquire link information starting from the one whose link target is associated with the largest number of link sources.

As described above, for the link relations having the same link target, the link mark is printed in the same print region for each page, and therefore the print regions are reduced as the number of link sources associated with the link target is increased. Further, if plural link sources are set for a certain information item, plural sites are making reference to that information item. That is, the information set as the link target is the information of high importance, and a higher printing priority is given to the link mark representing such an important reference relation than the link relation having a smaller number of reference relations. A lower limit may be set for the number of link sources associated with the link target, so that the link mark is printed when link sources equal to or greater in number than the lower limit are associated with the link target.

(2-4) Acquire link information starting from the one having the largest volume of pages inserted between the link source page and the link target page.

When a user looks for a link target page from a link source page, it is harder for the user to guess the link target page from the link source page, as the link source and target pages are located further apart, and therefore it takes more time to find the link target page. Accordingly, by giving a higher priority of printing the link mark to the link source having the larger volume of pages inserted between the link source and target pages, the time required to find the page associated with the link information can be reduced compared with the method in which a higher priority of printing the link mark is given to the link relation having a smaller volume of pages therebetween.

Note that the above-described designation of page range and acquisition order may both be performed. That is, link information may be acquired based on the acquisition order within the designated page range.

Users may be prompted to set the number of printed link marks up to the maximum printable number of link marks.

The process of narrowing down link information is performed as described above. For performing such a narrowing down process, a user may be prompted to designate the conditions for the narrowing down so that the link relation table production unit 14 can acquire the link information based on the conditions from an electronic document. Alternatively, the above-described narrowing down process may be performed when the number of link marks exceeds the maximum printable number. In such a case, after the link relation table production unit 14 produces the link relation table following the procedure shown in FIG. 6, the link relation table is referred to, thereby determining whether or not the print regions necessary to print the link marks exceed the upper limit. Each time the number of regions exceeds the upper limit, the user is prompted to select one of the plural narrowing down conditions, and the narrowing down process is performed based on the selected conditions. Alternatively, the narrowing down process is performed based on the narrowing down conditions selected by the user in advance.

Several examples will be given on a process of increasing the number of printable link marks (hereinafter referred to as a link mark increase process) by rendering the link marks to be distinguishable from each other even if plural link marks having different link targets are printed in the same print region.

<Visual Change of Link Marks>

Figure 9A:
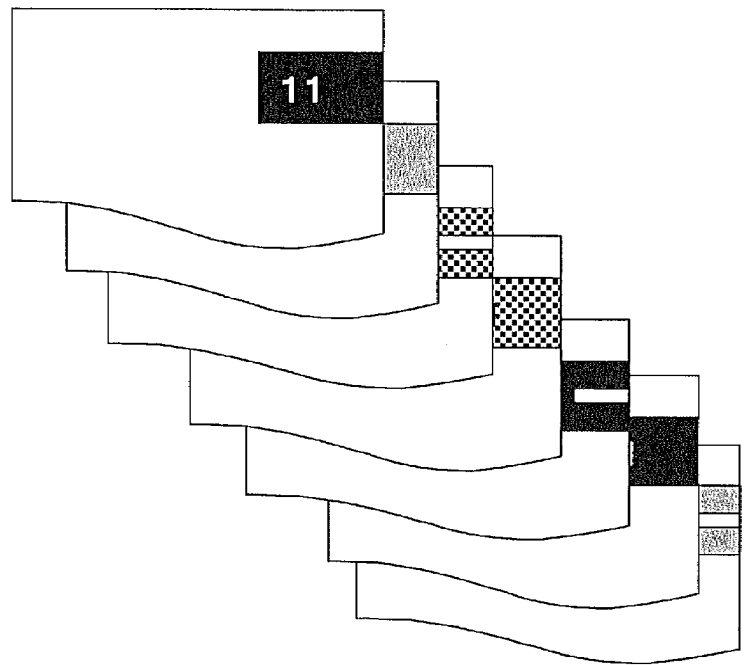
FIG. 9A is a view illustrating an example of visually different link marks.
Figure 9B:
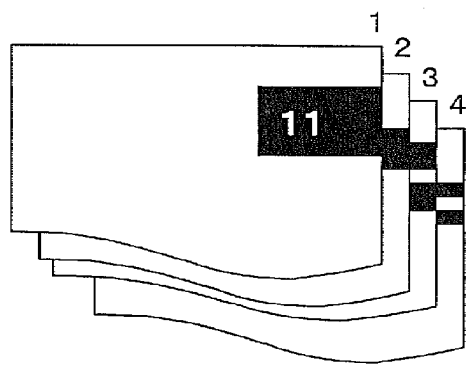
FIG. 9B is a view illustrating an example of visually different link marks.

Link marks including plural link targets are printed in overlapping print regions by making a visual change through alteration of the color or pattern of the link mark for each pair of a link source mark and a link target mark associated with the link source mark, as illustrated in FIG. 9A, or alteration of the width of the link mark for each pair, as illustrated in FIG. 9B. That is, plural pairs of link marks are printed in overlapping print regions. By thus making a visual change for each pair of link marks, the problem of indistinguishable link relations can be avoided even if link marks for link relations having different link targets are printed in overlapping print regions. That is, the number of printable link marks is increased. For example, when the link source page and link target page of the link relation 1 are page 1 and page 6, and those of the link relation 2 are page 2 and page 7, respectively, the link relations 1 and 2 can be distinguished as different relations even when the respective link marks are printed in overlapping print regions.

<Omitting Position Information>

Figure 10:
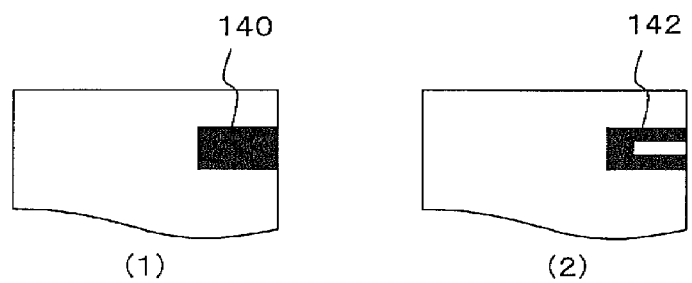
FIG. 10 is a view illustrating an example of a link mark used when position information is omitted.

Referring to FIG. 10, by printing a simplified link mark having a smaller print area and no position information, the print region for each link mark is reduced, and the number of linkable link marks can be increased. In FIG. 10, a link mark 140 indicates a link source, and a link mark 142 indicates a link target.

<Grouping the Pages>

Figure 11:
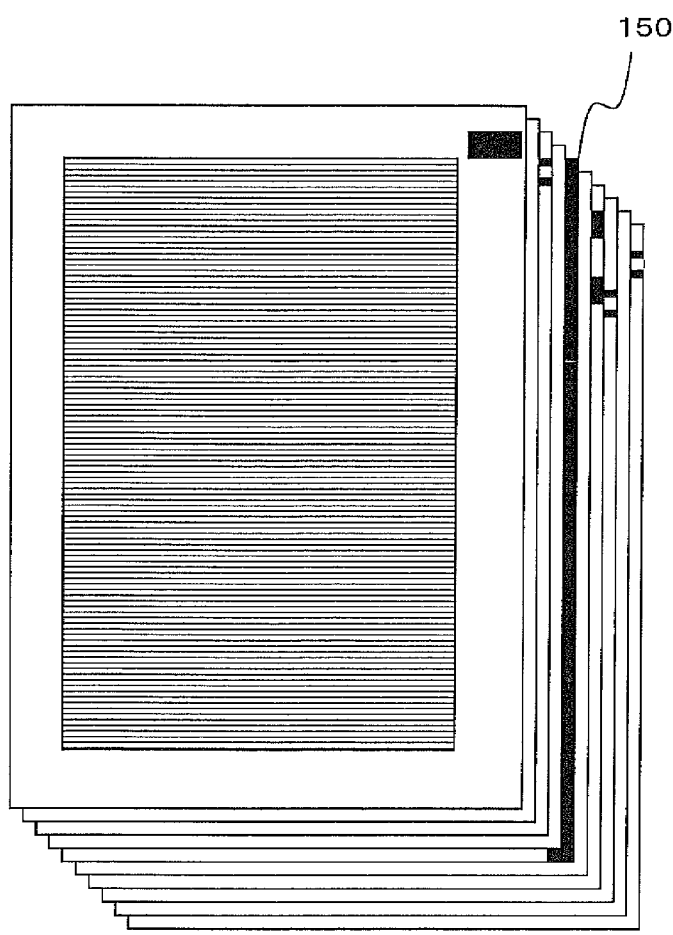
FIG. 11 is a view for describing an example when a link mark is printed for the pages divided into groups.

The number of printable link marks can be increased by dividing the pages into groups according to a chapter or the like, and allocating a link mark print region for each group so that plural link marks having different link targets can be printed in overlapping print regions. In such a case, groups are distinguished by, for example, putting an insert sheet 150 or the like between groups, as shown in FIG. 11. The sheet 150 may be a sheet having a blacked out side edge where no link mark is printed, or a sheet having a different color from the other sheets.

The printable link marks can be increased in a limited print region as described above. The above-described process of increasing link marks can be performed as necessary when, for example, the number of link marks exceeds the printable number. More specifically, in such a case, after the link relation table production unit 14 produces the link relation table through the procedure shown in FIG. 6, reference is made to the link relation table to determine whether or not the number of link marks to be printed exceeds the maximum printable number of link marks. Whenever the number is exceeded, the user is asked to designate at least one of plural link mark increase processes. Alternatively, at least one link mark increase process may be designated before acquiring link information.

Figure 12:
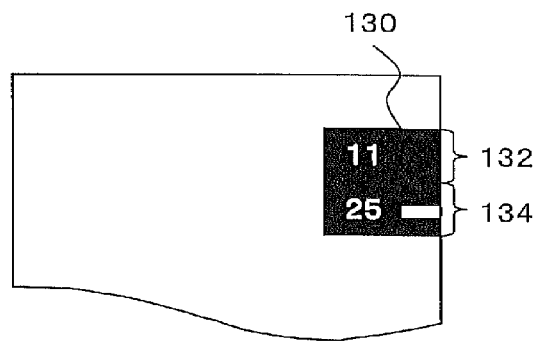
FIG. 12 is a view for describing an example of a link mark when the link source and the link target are both included on the same page.

Some electronic documents include the link source and the link target on the same page. In such a case, the linkmarks cannot be printed in the above-described manner in the print regions because the linkmarks are printed on the same page. Accordingly, if the link source and the link target are included on the same page, the print instruction information production unit 18 may produce print instruction information which does not include an instruction of printing a link mark corresponding to that link relation. Alternatively, as shown in FIG. 12, the print instruction information production unit 18 may produce print instruction information so that a new link mark 130 formed by a link source region 132 indicating a link source and a link target region 134 indicating a link target can be printed. The link mark 130 in FIG. 12 indicates that the link source is located on line 11, and the link target is on line 25 of the same page.

Figure 13:
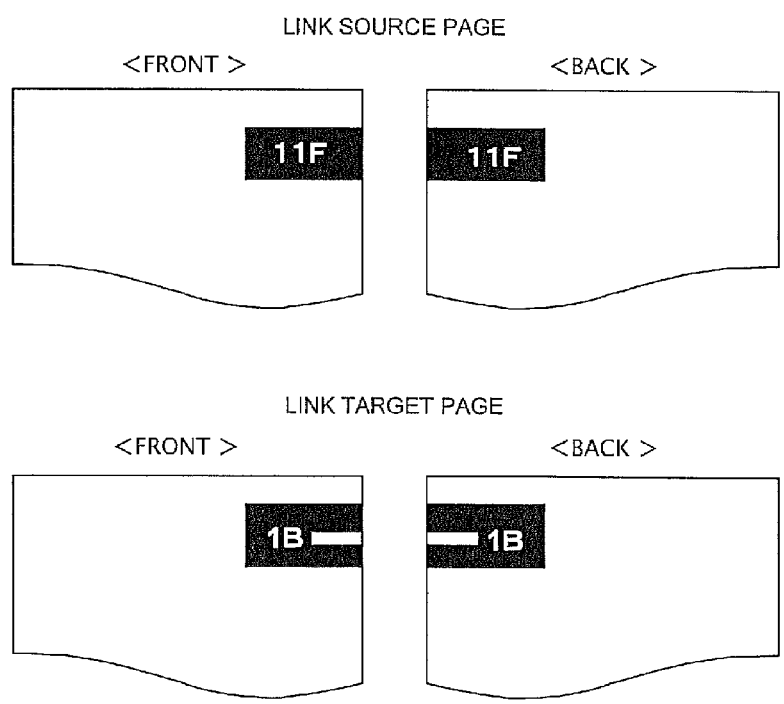
FIG. 13 is a view illustrating an example of link marks printed on both sides of a sheet when duplex printing is performed for an electronic document.

Further, when an electronic document is printed on both sides of the sheet, the print instruction information production unit 18 may produce the print instruction information so that the link marks are printed in the overlapping print regions on the front and back sides thereof, as shown in FIG. 13. In order to distinguish whether the link source/target is on the front side or the back side, an index, such as "F" for the front side and "B" for the back side, may be printed in the link mark.

Figure 14:
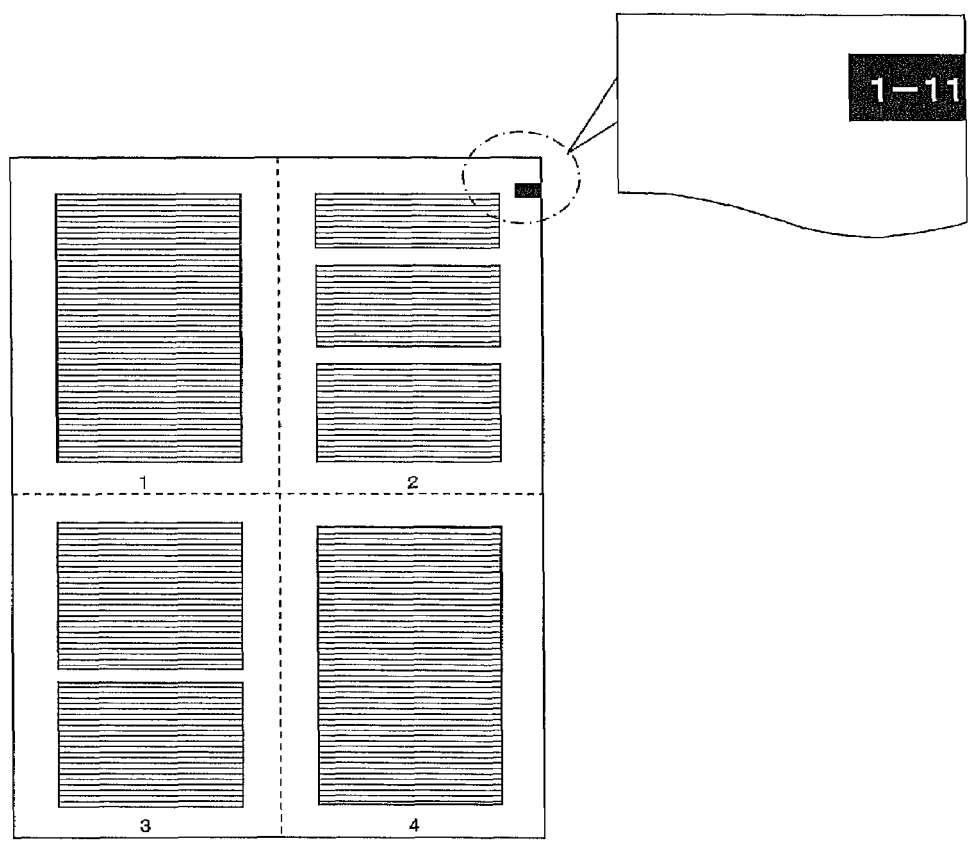
FIG. 14 is a view illustrating an example of a link mark printed on a sheet when plural pages forming an electronic document are printed on a single sheet.

When plural pages are printed on the same side of a single sheet, the print instruction information production unit 18 produces print instruction information so that, for example, the original page number is printed for each page in addition to the line number, as position information in the link mark, as shown in FIG. 14. Alternatively, when, for example, four pages are printed on a single sheet, the print instruction information production unit 18 may produce the print instruction information so that symbols suggesting the arrangement on the sheet, such as RU, LU, RD, and LD for upper right, upper left, lower right and lower left, respectively, may be printed in the link mark in addition to position information.

Figure 15A:
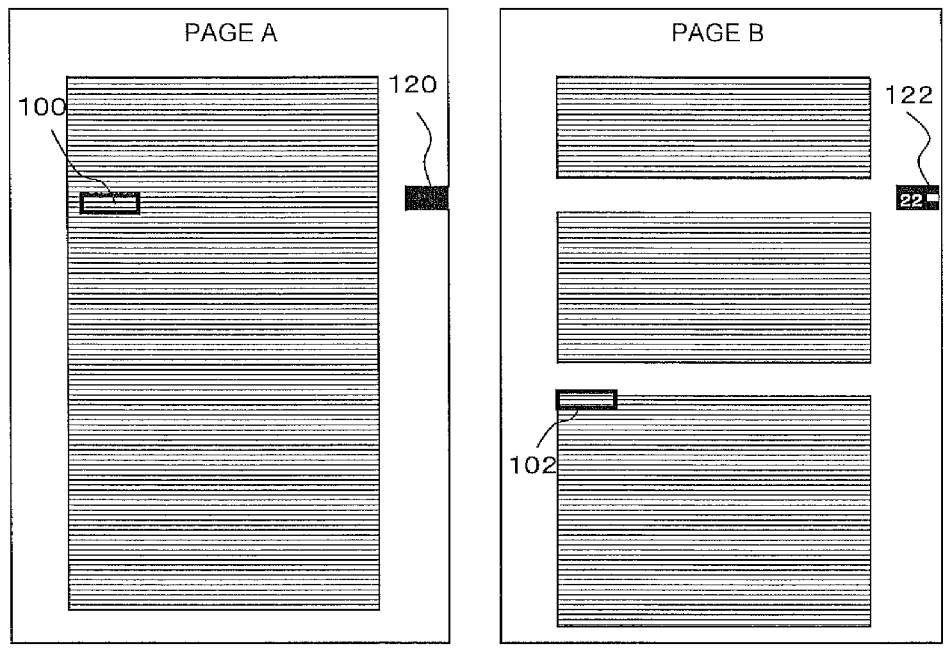
FIG. 15A is a view illustrating an example of a link mark when the position information in the link source mark is omitted.

While position information of the link source or target is printed in the link mark in the above-described example, the print instruction information may be produced so that the link source mark 120 is printed, for example, on the line extended from the link source in the width direction of the sheet, as shown in FIG. 15A, whereby the print instruction information production unit 18 may omit the position information in the link source mark. When plural link sources are associated with a single link target, these link sources may not be located on the same line. Therefore, the print instruction information in the link source mark may be omitted when a single link source is associated with a single link target.

Figure 15B:
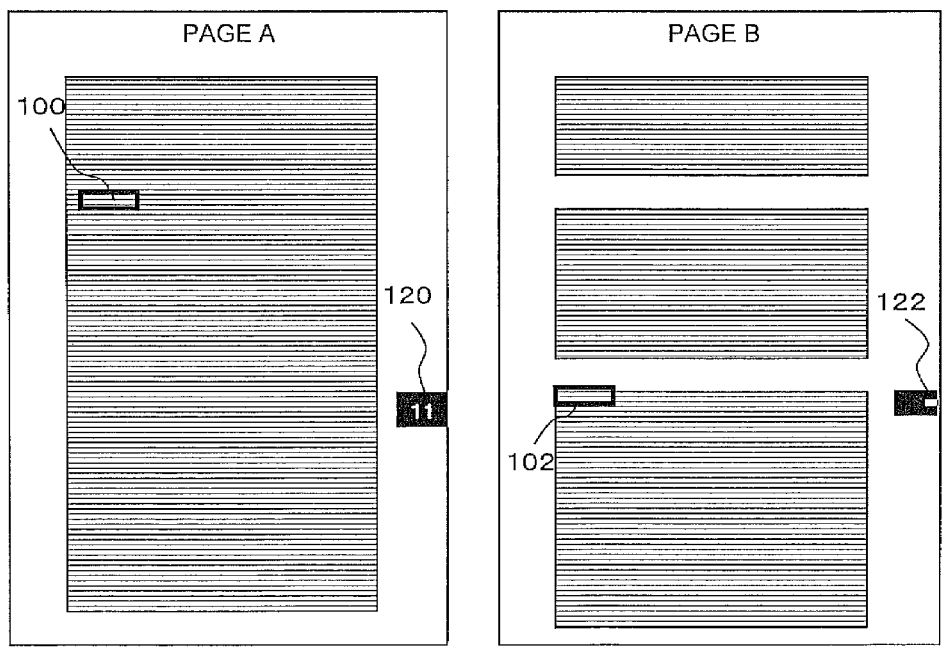
FIG. 15B is a view illustrating an example of a link mark when the position information in the link target mark is omitted.

Alternatively, as shown in FIG. 15B, the print instruction information may be produced so that the link target mark 122 is printed on the line extending from the link target in the width direction of the sheet, thereby omitting the position information in the link target mark. Because the position information can be printed in the link target mark, this approach can also be applied to the case in which plural link sources are associated with a single link target.

In the examples of the above description, the position information indicating the position of the link source or target is printed in the link mark, and a line is printed therein to show the link source and link target in a visually different manner. However, they may be printed outside the link mark as long as the user can associate them with the link marks.

Respective elements forming the image processing unit may be implemented by loading, from a recording medium, and installing a program for causing a microcomputer to embody the process for each unit from a storage medium, and executing the program. In this case, the program loaded from the storage medium implements the functions of the respective units described in the above exemplary embodiment. The microcomputer includes a CPU, a variety of memories, such as a ROM, a RAM, and an EEPROM, a communication bus, and an interface. The CPU reads the process program stored beforehand in the ROM as firmware, deploys it on the RAM, and sequentially executes the program.

The storage media for supplying the program to the computer may be, for example, a floppy (registered trademark) disk, a hard disk, an optical disk, a magneto-optical disk, a CD-ROM, a CD-R, a magnetic tape, a non-volatile memory card, or a ROM.

It is needless to say that the functions of the respective units described in the above description of the exemplary embodiment are implemented by the computer executing the program, and that the present invention includes the case in which the operating system (OS) and the like running on the computer performs some or all of the actual processes based on instructions of the program to achieve the functions of the respective units described in the above description of the exemplary embodiment through the process.

Further, it is also needless to say that the present invention also includes the case in which after the program loaded from a storage medium is written into a memory disposed in a function extension unit connected to a computer or a function extension board inserted into a computer, a CPU provided in the function extension board or unit performs part or all of the actual process based on instructions of the program to achieve the functions of the respective units described in the above description of the exemplary embodiment through the process.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processor, comprising:
   a reference information acquisition unit that acquires reference information for specifying a reference source and a reference target associated with the reference source from an electronic document having the reference information indicated therein; and
   a print instruction information production unit that produces print instruction information including an instruction for causing a printing device to print a reference source index for representing a reference source in a margin region located at a peripheral edge of a reference source page specified based on the reference information, and an instruction for causing the printing device to print a reference target index for representing a reference target in a region overlapping the region where the reference source index is printed in a margin region located at a peripheral edge of a reference target page specified based on the reference information, the overlapping printed reference source index and printed reference target index providing a visually perceived link between the reference source page and the reference target page, the reference source index representing a first printed visual pattern at the peripheral edge of the reference source page, the reference target index representing a second printed visual pattern different from the first printed visual pattern, at the peripheral edge of the reference target page.

2. The image processor according to claim 1, wherein the print instruction information production unit produces the print instruction information so that the reference source indices of a plurality of reference sources associated with the same reference target are printed in regions overlapping each other in the margin region located at the peripheral edge of the respective reference source pages.

3. The image processor according to claim 1, wherein the reference source index indicates position information for specifying a position of the reference source on a sheet.

4. The image processor according to claim 1, wherein the reference target index indicates position information for specifying a position of the reference target on a sheet.

5. The image processor according to claim 1, wherein the print instruction information production unit produces the print instruction information, so that when a plurality of index pairs, each formed by a single reference target index and at least one reference source index corresponding to the single reference target index, are printed in overlapping regions in a margin region located at each peripheral edge of different pages, each index pair is printed to be visually distinguishable from other index pairs.

6. The image processor according to claim 1, wherein a maximum number of reference target indices printable on a sheet is predetermined based on an area of the reference target index and an area of the margin region at the peripheral edge of a sheet, and the reference information acquisition unit narrows down the reference information based on predetermined conditions so that the number of reference targets acquired from the electronic document does not exceed the maximum number.

7. The image processor according to claim 6, wherein the reference information acquisition unit narrows down the reference information using as the predetermined conditions selection of the reference information in descending order starting with the one having the largest number of reference sources associated with the reference target.

8. The image processor according to claim 6, wherein the reference information acquisition unit narrows down the reference information using as the predetermined conditions selection of the reference information in descending order starting with the one having the largest number of pages inserted between a page including the reference source and the page including the reference target.

9. The image processor according to claim 1, wherein the reference information acquisition unit prompts a user to select a link relation corresponding to either (1) the link relation having both the link source and target included in the link range, (2) the link relation having at least the link source included in the link range, (3) the link relation having at least the link target included in the link range, or (4) the link relation having at least the link source or the link target in the link range;
   the reference information acquisition unit narrowing down the reference information according to the selected link relation.

10. A non-transitory computer readable storage medium storing a program causing a computer to execute a process for producing print instruction information given to a printing device, the process comprising:
    acquiring reference information for specifying a reference source and a reference target associated with the reference source from an electronic document having the reference information indicated therein; and
    producing the print instruction information including an instruction for causing the printing device to print a reference source index for representing a reference source in a margin region located at a peripheral edge of a reference source page specified based on the reference information, and an instruction for causing the printing device to print a reference target index for representing a reference target in a region overlapping the region where the reference source index is printed in a margin region located at a peripheral edge of a reference target page specified based on the reference information, the overlapping printed reference source index and printed reference target index providing a visually perceived link between the reference source page and the reference target page, the reference source index representing a first printed visual pattern at the peripheral edge of the reference source page, the reference target index representing a second printed visual pattern different from the first printed visual pattern, at the peripheral edge of the reference target page.

11. A method of producing print instruction information given to a printing device, the method comprising:

acquiring reference information for specifying a reference source and a reference target associated with the reference source from an electronic document having the reference information indicated therein; and producing the print instruction information including an instruction for causing the printing device to print a reference source index for representing a reference source in a margin region located at a peripheral edge of a reference source page specified based on the reference information, and an instruction for causing the printing device to print a reference target index for representing a reference target in a region overlapping the region where the reference source index is printed in a margin region located at a peripheral edge of a reference target page specified based on the reference information, the overlapping printed reference source index and printed reference target index providing a visually perceived link between the reference source page and the reference target page, the reference source index representing a first printed visual pattern at the peripheral edge of the reference source page, the reference target index representing a second printed visual pattern different from the first printed visual pattern at the peripheral edge of the reference target page.

12. The image processor according to claim 1, wherein a link mark is printed when a link source and a link target are located on the same page.

13. The image processor according to claim 1, wherein information for distinguishing whether the link source or the link target is on the front side or the back side is included in the link mark when printing is performed on both sides of the sheet.

14. The image processor according to claim 1, wherein the original page number is printed for each page in addition to the line number as position information in the link mark when plural pages are printed on the same side of a single sheet.

15. The image processor according to claim 1, wherein the width of the link mark for each pair of a link source mark and a link target mark is altered.

16. The image processor according to claim 1, wherein a side edge of the sheet where no link mark is printed is blacked out to divide the pages in the electronic document into groups.

* * * * *